Patented Sept. 27, 1938

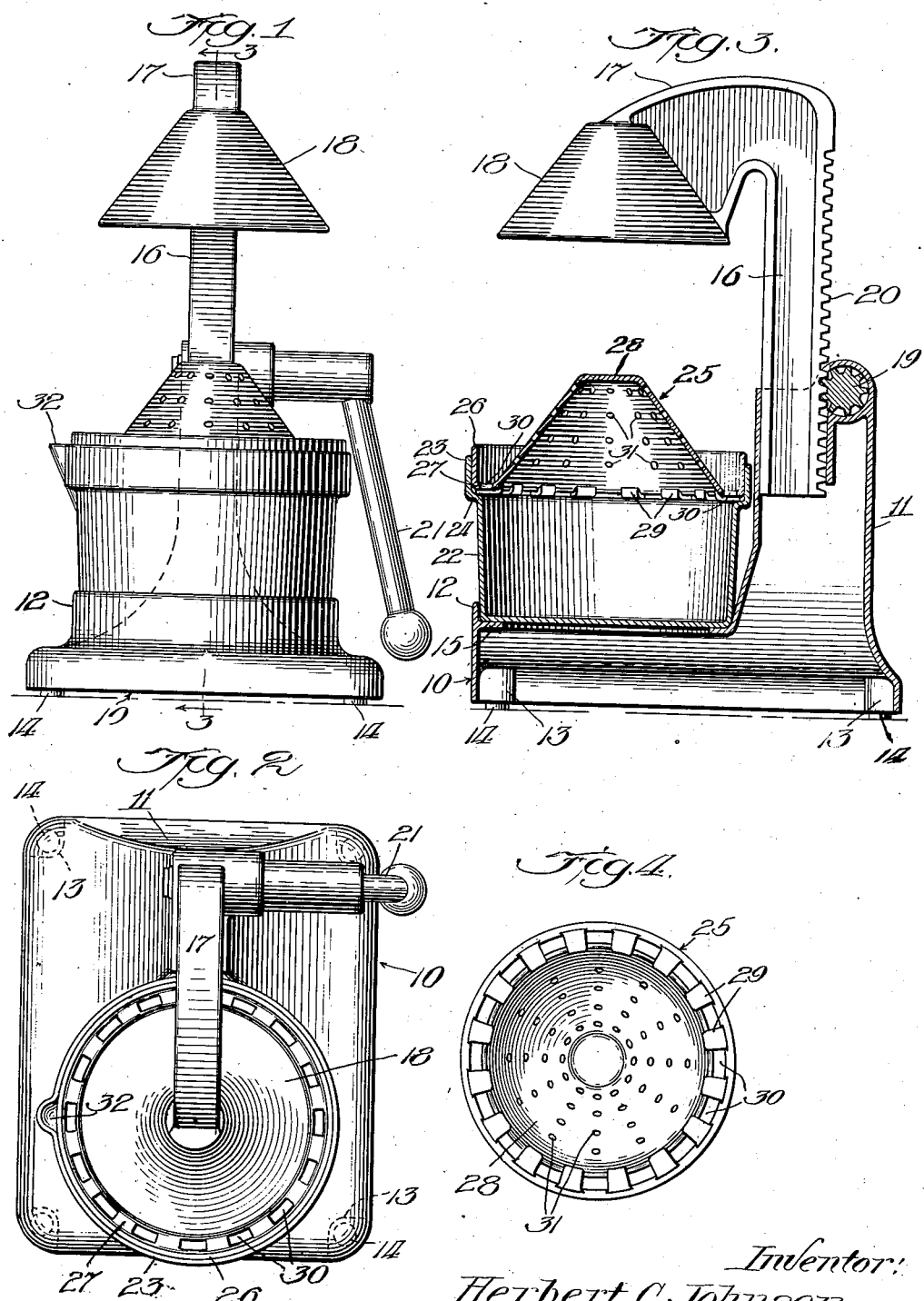

2,131,440

UNITED STATES PATENT OFFICE 2,131,440

JUICE EXTRACTING DEVICE

Herbert C. Johnson, Chicago, Ill.

Application March 31, 1937, Serial No. 133,976

5 Claims. (Cl. 100—42)

My invention relates to juice-extracting devices and has to do more particularly with a manually operable device of this character well suited for domestic or other use in extracting juices from fruits such as oranges, lemons, etc.

One of the objects of my invention is to provide an improved device of the foregoing character.

Another object is to provide a juice-extracting device of the squeezer type which embodies but few parts arranged in a compact form that may be stored away in a comparatively small space, and which is simple in construction, is inexpensive to manufacture, is highly durable and is adapted for rapidly extracting substantially all of the juice from the fruit.

A further object is to provide a device of the foregoing character embodying relatively movable squeeze members, one of which is removably supported by a removable juice receiving receptacle, the arrangement being such that all of the juice extracted from the fruit is positively confined and received within the receptacle and the removable parts may be easily and quickly removed for proper cleaning after use.

Other objects and advantages will become apparent as this description progresses, and by reference to the drawing wherein—

Figure 1 is a front elevational view of one form of device embodying my invention;

Fig. 2 is a top plan view of the structure shown in Fig. 1;

Fig. 3 is a side elevational view, partially in vertical section, of the structure shown in Fig. 1, the same being taken substantially on line 3—3 of such figure; and Fig. 4 is a bottom plan view of the receptacle-supported squeezer cone member.

The structure illustrated includes a shell-like base portion 10 which, preferably but not necessarily, is of general rectangular shape. The rear end of the base 10 is provided with an upstanding, comparatively narrow tubular part 11 located midway between the sides of the base. The upper portion of the base 10, forwardly of the tubular part 11, takes the form of an upstanding open-ended cylindrical shell part 12 forming a receptacle receiving pocket of less width than the base and located centrally thereof. The lower outer portion of the shell-like base is of skirt-like form and it has leg members 13 with surface-engaging elements 14 formed of rubber or other material which will not mar or injure the surface upon which the device is placed. The cylindrical shell or pocket part 12 of the base is provided with an inwardly extending annular flange 15, the purpose of which will be referred to hereinafter.

The upstanding tubular part 11 of the base slidably receives a rack bar 16 having an integral, laterally extending arm 17 rigidly (preferably integral) supporting an imperforate female squeezer cone 18. The rack bar 16 and its arm 17 are so constructed and arranged that the axis of the squeezer cone 18 coincides with the axis of the cylindrical base part 12. The upstanding tubular base part 11 further supports a pinion 19 operatively engaged with the teeth 20 of the rack bar 16, which pinion is actuated by a handle structure 21 to reciprocate the rack bar 16 and squeezer cone 18 toward and from the base 10.

In carrying out my invention, the imperforate, movable squeezer cone 18 is moved upon and away from an aligned, base-supported stationary male squeezer cone which is adapted to initially support the fruit and which is also of strainer-like construction so that some of the fruit juices may pass therethrough. The strainer-like squeezer cone is arranged to be removably supported by a removable receptacle which is adapted to receive and confine the extracted juices. This feature of my invention is quite important in that it eliminates the necessity of the user employing a separate receptacle for receiving the extracted juices, as is necessary with prior devices of this kind, whereby waste of the extracted juices is avoided and smearing of the juice upon surrounding objects, due to improper placement or accidental tipping or upsetting of the separate receptacle, cannot take place.

To the foregoing end, I employ a cylindrical receptacle 22 of such size that it fits snugly within cylindrical base pocket 12 and seats upon the annular base flange 15. The upper end portion 23 of the cup 22 is of enlarged diameter, providing an annular shoulder 24 spaced slightly inward from the top of the cup. The cup 22 removably supports a cone unit 25 which includes a cylindrical upstanding skirt-like portion 26 that fits snugly within the upper enlarged portion of the cup. The lower edge of the skirt 26 is provided with an inwardly extending, comparatively narrow bottom flange or bridge 27 which integrally supports at its inner edge an upstanding strainer-type male cone member 28. The bottom surface of the flange 27 is provided with a row of annular, spaced ribs or lugs 29 which are adapted to engage the receptacle shoulder 24 so as to hold the bottom flange portion 27 spaced from the shoulder 24 and the wall of the cup. These ribs or lugs also serve to strengthen and brace the bridge flange 27, against the strain placed thereon during the squeezing operation. The surface of the bridge flange 27 between the lugs 29 is cut away to provide openings 30 through which the juice extracted from the fruit may drain into the bottom portion of the receptacle 22.

In the use of the structure just described, the fruit, for example an orange, is cut in preferably two parts and it is then placed upon the squeezer cone 28 with its meat portion directed toward the same. The handle 21 is then rotated in counterclockwise direction (as viewed in Fig. 3) toward the front part of the machine, causing the squeezer cone 18 to move downwardly and engage the fruit. As the movement of the handle is continued, and the squeezer cone 18 is moved fully downward upon the cone member 28, the juice is extracted from the fruit and part of it passes into the receptacle 22 through the strainer openings 31 in the cone 28 and part through the base openings 30. It will be understood that the shoulder 24 of the receptacle 22 is located at such a position that the cone 28 is held at the proper height for full cooperation with the squeezer cone 18 and so that the cone 28 may be received substantially completely within the cone 18 in the fully lowered position of the latter. Also, the base 10 is of such area that it avoids tipping of the device when the handle 21 is actuated. After the juice has been extracted in the manner stated from one or more pieces of fruit and the cup is filled to the desired extent, the cone unit 25 is removed by grasping the upper edge of the skirt 26 of such unit which is of sufficient length to project slightly above the upper edge of the cup 22. For convenience in pouring the juice from the cup 22, it is provided with a spout 32 at its upper edge portion. It will be seen from the foregoing that the cup 26 not only serves as a removable, stationary and rigid structure for the cone unit 25, but the cup and cone unit may be readily separated for dispensing the extracted juices and for also quickly and easily cleaning these parts.

It is believed that the operation and advantages of my invention will be readily understood from the foregoing. It is to be understood that, while I have shown only one form of device embodying my invention, other changes in details and arrangements of parts may be resorted to without departing from the spirit and scope of my invention as defined by the claims that follow.

I claim:

1. A juice extracting device which comprises a base having a pocket therein, a receptacle having a closed bottom part snugly and removably seated in said pocket and having an enlarged open top part, a shoulder being formed at the juncture of said top and bottom receptacle parts, an integral squeeze unit including a skirt part snugly and removably fitted within the open end of said receptacle and projecting outwardly therebeyond, a frusto-conical, strainer-type squeeze member, a perforated bridge part connecting the lower edges of said skirt and squeeze member, and an annular row of spaced lug or rib elements on the under side of said bridge part adapted to engage and space said bridge part from said shoulder and also adapted to brace and strengthen said bridge part, a second and similarly-shaped imperforate squeeze member, a support movable axially of the first squeeze member and which carries said second squeeze member in alignment with said first squeeze member, and means for moving said support.

2. A juice extracting device which comprises, a base having a pocket therein, a receptacle having a closed bottom part snugly and removably seated in said pocket and having an enlarged open top part, a shoulder being formed at the juncture of said top and bottom receptacle parts, an integral squeeze unit including a skirt part snugly and removably fitted within the open end of said receptacle, a frusto-conical strainer-type squeeze member, a perforated bridge part connecting the lower edges of said skirt and squeeze member, and means on the under side of said bridge part adapted to engage and space said bridge part from said shoulder and also adapted to brace and strengthen said bridge part, a second and similarly-shaped imperforate squeeze member, means supporting said second squeeze member in alignment with the first squeeze member, and means for moving said support means back and forth to move said second squeeze member toward and from the first squeeze member.

3. A juice extracting device comprising, a base having a pocket therein, a receptacle having its bottom part removably received in said pocket, an integral squeeze unit including a skirt part removably fitted within the open end of said receptacle, a frusto-conical strainer-type squeeze member extending upwardly of said receptacle, a perforated bridge part connecting the lower edges of said skirt and squeeze member, and spaced lug or rib elements on the under side of said bridge part adapted to engage and space said bridge part from the receptacle wall and also adapted to brace and strengthen said bridge part, a movable squeeze member, a support movable axially of the first squeeze member and which carries said movable squeeze member in alignment with said first squeeze member, and means for moving said support.

4. A juice extracting device comprising, a base having a pocket therein, a receptacle having its bottom part removably received in said pocket and having an upper squeeze unit supporting wall; an integral squeeze unit removably supported on said receptacle wall and including a frusto-conical strainer type squeeze member extending upwardly of said receptacle, an annular upstanding skirt part, a perforated bridge part connecting the lower edges of said skirt and said squeeze member and means including spaced lug or rib elements on the under side of said bridge part adapted to brace and strengthen said bridge part and also adapted to engage and space said bridge part from the receptacle wall whereby liquids can pass through the perforations of said bridge part past the lug or rib elements and into the receptacle, a movable squeeze member disposed in alignment with said first squeeze member and means for moving said movable squeeze member axially of said first squeeze member.

5. A juice extracting device comprising, a base having a pocket therein, a receptacle having its bottom part removably received in said pocket and having an upper squeeze unit supporting wall, an integral squeeze unit removably supported on said receptacle wall and including a frusto-conical strainer type squeeze member extending upwardly of said receptacle, a skirt part, a perforated bridge part connecting the lower edges of said skirt and squeeze member and lug or rib elements at spaced intervals on the bottom of the squeeze unit, said lug or rib elements terminating short of the outer periphery of the squeeze unit and adapted to space said bridge part from the receptacle wall whereby said squeeze unit may be positioned on the supporting wall of said receptacle in such a manner that liquids can pass through the perforations of said bridge part past the lug or rib elements and into the receptacle, a movable squeeze member, a support movable axially of the first squeeze member and which carries said movable squeeze member in alignment with said first squeeze member, and means for moving said support.

HERBERT C. JOHNSON.